(12) United States Patent
Chu et al.

(10) Patent No.: US 8,331,980 B2
(45) Date of Patent: Dec. 11, 2012

(54) PORTABLE ELECTRONIC APPARATUS CAPABLE OF SIMULATING AS A WIRELESS COMMUNICATION PRODUCT AND METHOD THEREOF

(75) Inventors: Shih-Hung Chu, Taoyuan County (TW); Yu-Hsin Liang, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 458 days.

(21) Appl. No.: 12/538,856

(22) Filed: Aug. 10, 2009

(65) Prior Publication Data
US 2010/0285838 A1 Nov. 11, 2010

(30) Foreign Application Priority Data
May 7, 2009 (TW) .................................. 98115131 A

(51) Int. Cl.
*H04M 1/00* (2006.01)
(52) U.S. Cl. .................................. 455/556.1; 455/550.1
(58) Field of Classification Search ............... 455/550.1, 455/552.1, 553.1, 556.1, 556.2, 557
See application file for complete search history.

(56) References Cited

U.S. PATENT DOCUMENTS

| 7,221,961 | B1 * | 5/2007 | Fukumoto et al. ............. 455/557 |
| 2002/0081993 | A1 | 6/2002 | Toyoshima | |
| 2005/0266876 | A1 * | 12/2005 | Boesen ...................... 455/552.1 |
| 2006/0094462 | A1 * | 5/2006 | Nguyen et al. ............. 455/556.1 |
| 2007/0080934 | A1 * | 4/2007 | Chen et al. ................... 345/156 |
| 2008/0140886 | A1 * | 6/2008 | Izutsu ............................ 710/69 |
| 2010/0022233 | A1 * | 1/2010 | Jung et al. .................... 455/419 |
| 2010/0069003 | A1 * | 3/2010 | Kim ............................ 455/41.2 |

FOREIGN PATENT DOCUMENTS

| CN | 1620167 A | 5/2005 |
| CN | 1761197 A | 4/2006 |
| CN | 1946214 A | 4/2007 |
| EP | 1 473 951 A2 | 11/2004 |

OTHER PUBLICATIONS

Office action mailed on Aug. 31, 2012 for the China application No. 200910160351.8, filing date Aug. 7, 2009, p. 1-8.

* cited by examiner

*Primary Examiner* — Nhan Le
(74) *Attorney, Agent, or Firm* — Winston Hsu; Scott Margo

(57) ABSTRACT

A portable electronic apparatus consists of a wireless module, a micro-processing unit, a determining circuit, and a control circuit. The wireless module provides a wireless communication function, and a first controller of the micro-processing unit provides a data access function. When a designated device is coupled to the portable electronic apparatus, the determining circuit determines whether to use the wireless communication function and whether to use the data access function in order to generate a determining result. The control circuit selectively connects a transmission interface of the first controller or a transmission interface of the wireless module to the designated device according to the determining result. When the control circuit connects the transmission interface of the wireless module to the designated device, the portable electronic apparatus is simulated as a wireless communication product.

17 Claims, 5 Drawing Sheets

PORTABLE ELECTRONIC APPARATUS CAPABLE OF SIMULATING AS A WIRELESS COMMUNICATION PRODUCT AND METHOD THEREOF

BACKGROUND OF THE INVENTION

1. Field of the Invention

The present invention relates to a portable electronic apparatus (e.g. a mobile phone) capable of simulating as a wireless communication product (e.g. a wireless LAN card) and method thereof, and more particularly, to a portable electronic apparatus is able to directly use a wireless communication function (e.g. wireless Internet access) offered by the portable electronic apparatus without processes of its CPU and method thereof.

2. Description of the Prior Art

With the evolution of mobile communication technology, a utility rate of a mobile communication device is getting higher and higher, and the chance of utilizing a mobile phone to connect to Internet is also increasing. Therefore, in any place with wireless Internet access, a user can enjoy wireless communication services, such as browsing Internet, checking Email, looking parking information up, watching WebTV, etc through a mobile phone at any time.

At present, equipments such as a notebook computer or a desktop computer are able to connect to a mobile phone to access wireless Internet via a connection interface, such as universal serial bus (USB), infrared rays (IR), or blue-tooth. However, because the data transmission path of connecting the notebook computer to a wireless module of the mobile phone is too long, and the central processing unit as well as operating system of the mobile phone are required for data processing and format conversion, it will slow down the overall processing speed and result in a poor performance. In addition, when the notebook computer accesses wireless Internet through the mobile phone, it must continuously communicate with the components of the mobile phone, such as the central processing unit, memory, and wireless module, and access data between them. Actually, these actions are quite power-consuming.

SUMMARY OF THE INVENTION

It is one of the objectives of the claimed invention to provide a portable electronic apparatus capable of simulating as a wireless communication product and a related method to solve the abovementioned problems.

According to one embodiment, a portable electronic apparatus capable of simulating as a wireless communication product is provided. The portable electronic apparatus consists of a wireless module, a micro processing unit, a determining circuit, and a control circuit. The wireless module provides a wireless communication function. The micro processing unit consists of a first controller and a second controller. The first controller controls operations of the portable electronic apparatus and provides a data access function. The second controller controls operations of the wireless module. When a designated device is coupled to the portable electronic apparatus, the determining circuit determines whether to use the wireless communication function and whether to use the data access function to generate a determining result. The control circuit is coupled to the determining circuit and selects to connect a transmission interface of the first controller or a transmission interface of the wireless module to the designated device according to the determining result. The wireless communication product can be a wireless LAN card, and the wireless communication function of the wireless module can be a wireless Internet access function.

According to another embodiment, a method for simulating a wireless communication product by utilizing a portable electronic apparatus is provided. The portable electronic apparatus consists of a wireless module for providing a wireless communication function and a first controller for providing a data access function. The method includes the following steps: when a designated device is coupled to the portable electronic apparatus, determining whether the designated device uses the wireless communication function and whether the designated device uses the data access function to generate a determining result; and selecting to connect a transmission interface of the first controller or a transmission interface of the wireless module to the designated device according to the determining result. When the determining result indicates that the designated device chooses to use the wireless communication function without using the data access function, connect the transmission interface of the wireless module to the designated device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
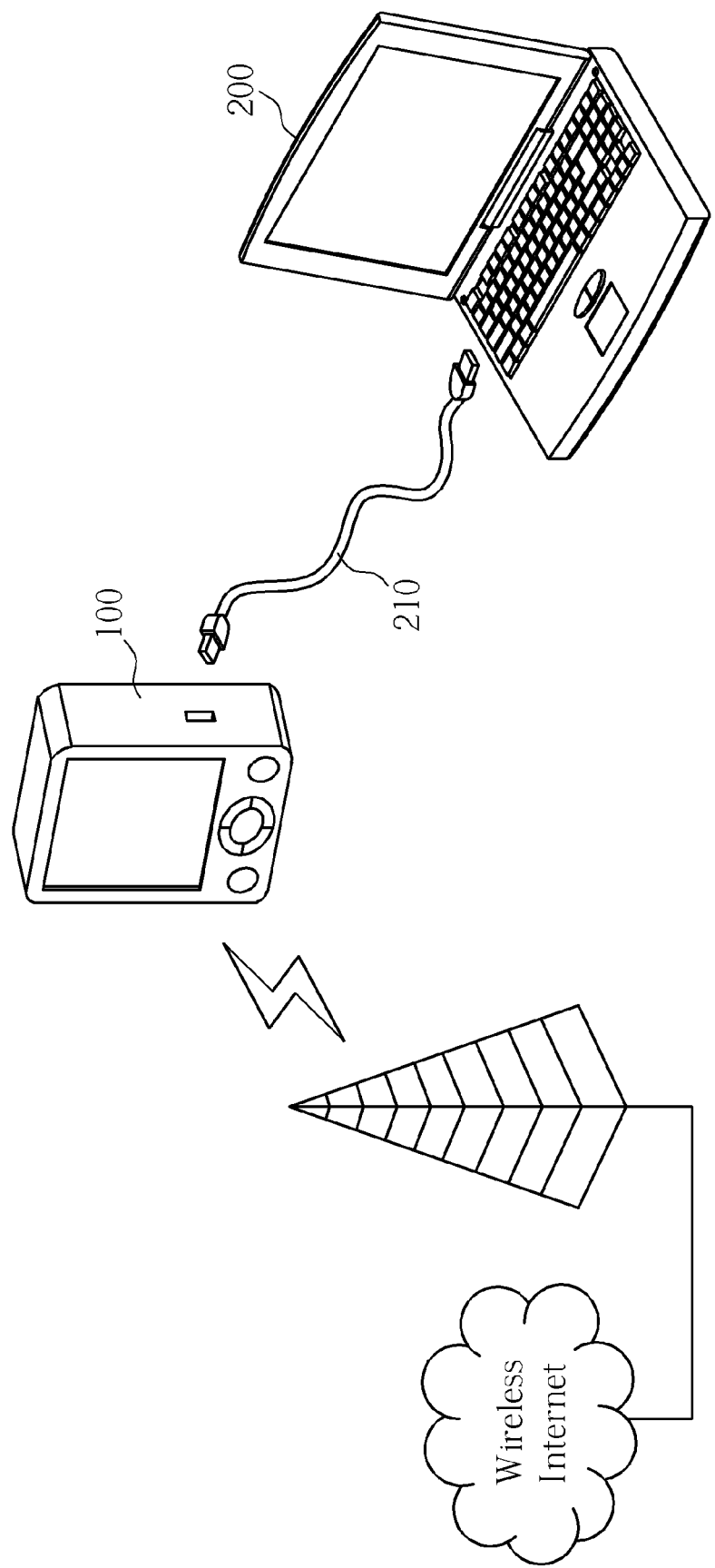
FIG. 1 is a schematic diagram of the appearance of a portable electronic apparatus capable of simulating as a wireless communication product.
Figure 2:
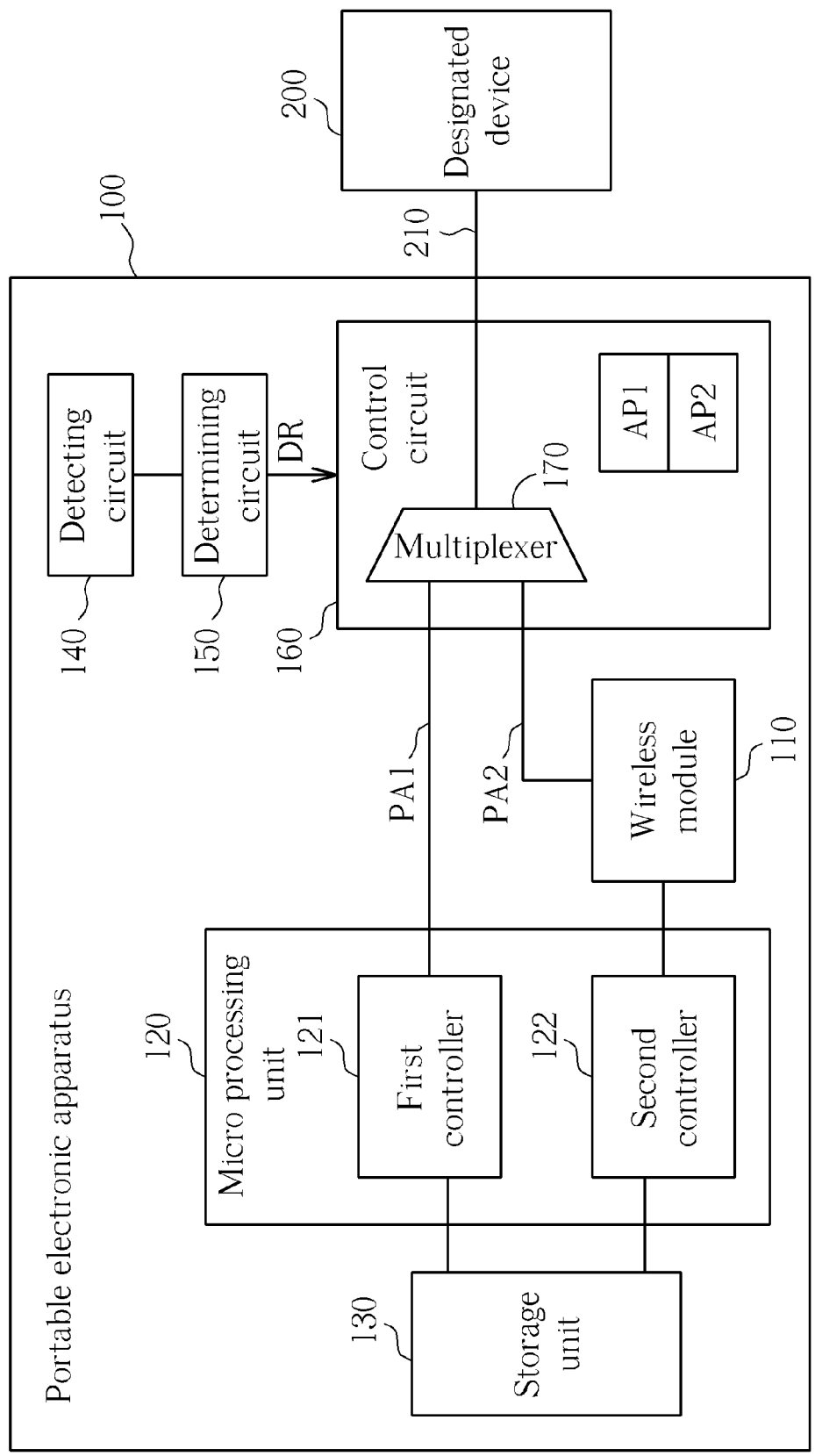
FIG. 2 is a block diagram of the portable electronic apparatus shown in FIG. 1 according to a first embodiment of the present invention.

Please refer to FIG. 1 together with FIG. 2. FIG. 1 is a schematic diagram of the appearance of a portable electronic apparatus 100 capable of simulating as a wireless communication product, and FIG. 2 is a block diagram of the portable electronic apparatus 100 shown in FIG. 1 according to a first embodiment of the present invention. In this embodiment, the portable electronic apparatus 100 can be a mobile phone or a personal digital assistant (PDA), but the present invention is not limited to this only and can be portable electronic apparatuses of other types. As shown in FIG. 1, a designated device 200 is coupled to the portable electronic apparatus 100 via a connection interface 210, such as infrared rays (IR), blue-tooth, or USB. The designated device 200 can be a notebook computer or a desktop computer, but this should not be considered as limitations of the present invention. When the designated device 200 is coupled to the portable electronic apparatus 100, it can determine whether to use a data access function and/or a wireless communication function offered by the portable electronic apparatus 100 so as to proceed a synchronous data transmission between the portable electronic apparatus 100 or access a wireless Internet via the portable electronic apparatus 100.

As shown in FIG. 2, the portable electronic apparatus 100 consists of, but is not limited to, a wireless module 110, a micro processing unit 120, a storage unit 130, a detecting circuit 140, a determining circuit 150, and a control circuit 160. The wireless module 110 provides a wireless communication function, such as a wireless Internet access function. The micro processing unit 120 consists of a first controller 121 and a second controller 122. The first controller 121 controls operations of the portable electronic apparatus 100 and provides a data access function, and the second controller 122 controls operations of the wireless module 110. The storage unit 130 (e.g. a memory) is coupled to the first controller 121 and the second controller 122 for providing memory spaces of data access.

The detecting circuit 140 is coupled to the determining circuit 150, and it detects whether the portable electronic apparatus 100 is coupled to the designated device 200. When the detecting circuit 140 detects that the portable electronic apparatus 100 is coupled to the designated device 200, the determining circuit 150 determines whether the designated device 200 uses the wireless communication function and whether the designated device 200 uses the data access function to generate a determining result DR. The control circuit 160 is coupled to the determining circuit 150 for selecting to connect a transmission interface of the first controller 121 or a transmission interface of the wireless module 110 to the designated device 200 according to the determining result DR.

Please note that when the control circuit 160 connects the transmission interface of the wireless module 110 to the designated device 200, the portable electronic apparatus 100 can be simulated as a wireless communication product. The wireless communication product can be a wireless LAN card, and the wireless communication function of the wireless module 110 can be a wireless Internet access function. However, those skilled in the art should appreciate that this should not be considered as a limitation of the present invention.

In the following descriptions, several examples are taken for illustrating how the control circuit 160 operates. In a first condition, when the determining result DR of the determining circuit 150 indicates that the designated device 200 chooses to use the wireless communication function without using the data access function, the control circuit 160 connects the transmission interface of the wireless module 110 to the designated device 200. That is, a second path PA2 and the connection interface 210 are connected. In a second condition, when the determining result DR indicates that the designated device 200 chooses to use the data access function without using the wireless communication function, the control circuit 160 connects the transmission interface of the first controller 121 to the designated device 200. That is, a first path PA1 and the connection interface 210 are connected. In a third condition, when the determining result DR indicates that the designated device 200 chooses to use the wireless communication function together with the data access function simultaneously, the control circuit 160 connects the transmission interface of the first controller 121 to the designated device 200. In other words, the first path PA1 and the connection interface 210 are connected.

Be noted that because the micro processing unit 120 of the portable electronic apparatus 100 is a power-consuming element, the control circuit 160 can control the micro processing unit 120 to enter a power-saving mode (such as a stand-by mode) to save power consumption when the designated device 200 chooses to use the wireless communication function without using the data access function. Furthermore, when the designated device 200 chooses to use the data access function without using the wireless communication function, the micro processing unit 120 is required for accessing data from the storage unit 130. Similarly, when the designated device 200 chooses to use the wireless communication function together with the data access function simultaneously, the micro processing unit 120 is also required for accessing data from the storage unit 130 and for controlling operations of the wireless module 110.

In addition, if the wireless module 110 is in different modes or on different transmission paths, the designated device 200 must switch different drivers and firmware of the wireless module 110 in order to use the wireless communication function offered by the wireless module 110. For example, when the designated device 200 chooses to use the wireless communication function together with the data access function simultaneously (i.e. the connection interface 210 is connected to the transmission interface of the first controller 121), the control circuit 160 performs a first designated application program AP1 to select the original drivers and firmware of the wireless module 110; and when the designated device chooses to use the wireless communication function without using the data access function (i.e. the connection interface 210 is directly connected to the transmission interface of the wireless module 110), the control circuit 160 performs a second designated application program AP2 to switch the drivers and firmware of the wireless module 110. Therefore, the designated device 200 is able to directly use the wireless communication function (e.g. the wireless Internet access function) offered by the wireless module 110 without processes of the micro processing unit 120.

The abovementioned embodiments are presented merely for illustrating applications of the present invention, and in no way should be considered to be limitations of the scope of the present invention. Those skilled in the art should appreciate that various modifications of the portable electronic apparatus 100 may be made without departing from the spirit of the present invention. Moreover, the detecting circuit 140 and the determining circuit 150 are optional elements, and can be omitted or can be replaced by other elements that can achieve the same goal. For example, the user can directly select to switch different modes of the portable electronic apparatus 100 so as to determine whether to use the wireless communication function and/or the data access function. At this time, the determining circuit 150 is replaced by the selection of the user.

In the aforementioned embodiments, the control circuit 160 can consist of a multiplexer 170, and thus the control circuit 160 can select to connect the transmission interface of the first controller 121 or the transmission interface of the wireless module 110 to the designated device 200 via the multiplexer 170. In other words, the control circuit 160 performs a switching operation upon the first path PA1 and the second path PA2 by using the multiplexer 170. This is merely an example for illustrating the present invention, and in no way should be considered to be limitations of the scope of the present invention. Those skilled in the art should appreciate that various modifications of the control circuit 160 may be made without departing from the spirit of the present invention.

Figure 3:
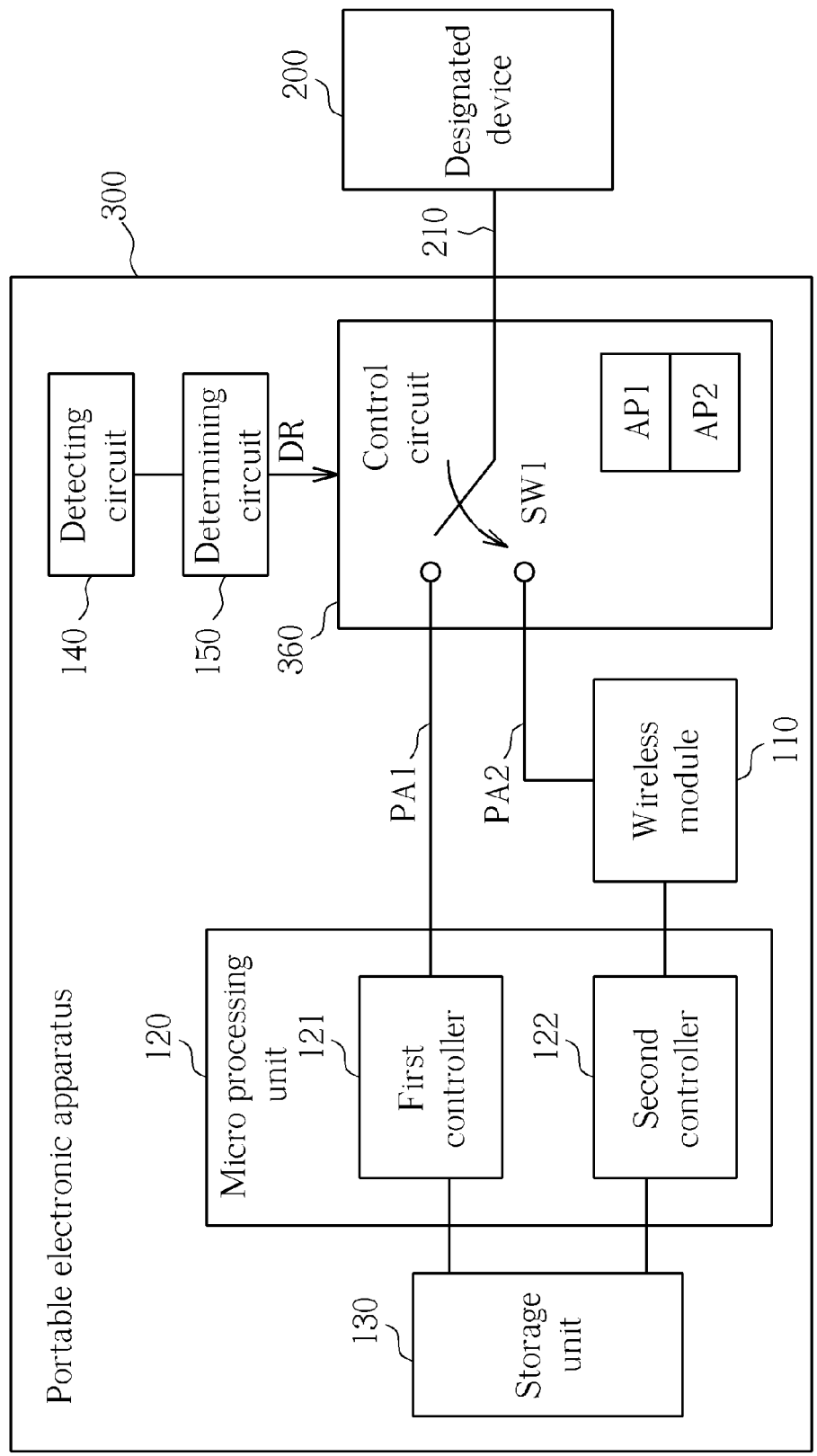
FIG. 3 is a block diagram of the portable electronic apparatus shown in FIG. 1 according to a second embodiment of the present invention.

Please refer to FIG. 3. FIG. 3 is a block diagram of the portable electronic apparatus shown in FIG. 1 according to a second embodiment of the present invention. In FIG. 3, the architecture of the portable electronic apparatus 300 is similar to that of the portable electronic apparatus 100 shown in FIG. 2, and the difference between them is that a control circuit 360 of the portable electronic apparatus 300 consists of a switch SW1. The control circuit 360 can perform a switching operation upon the first path PA1 and the second path PA2 by using the switch SW1 so as to select to connect the transmission interface of the first controller 121 or the transmission interface of the wireless module 110 to the designated device 200.

Figure 4:
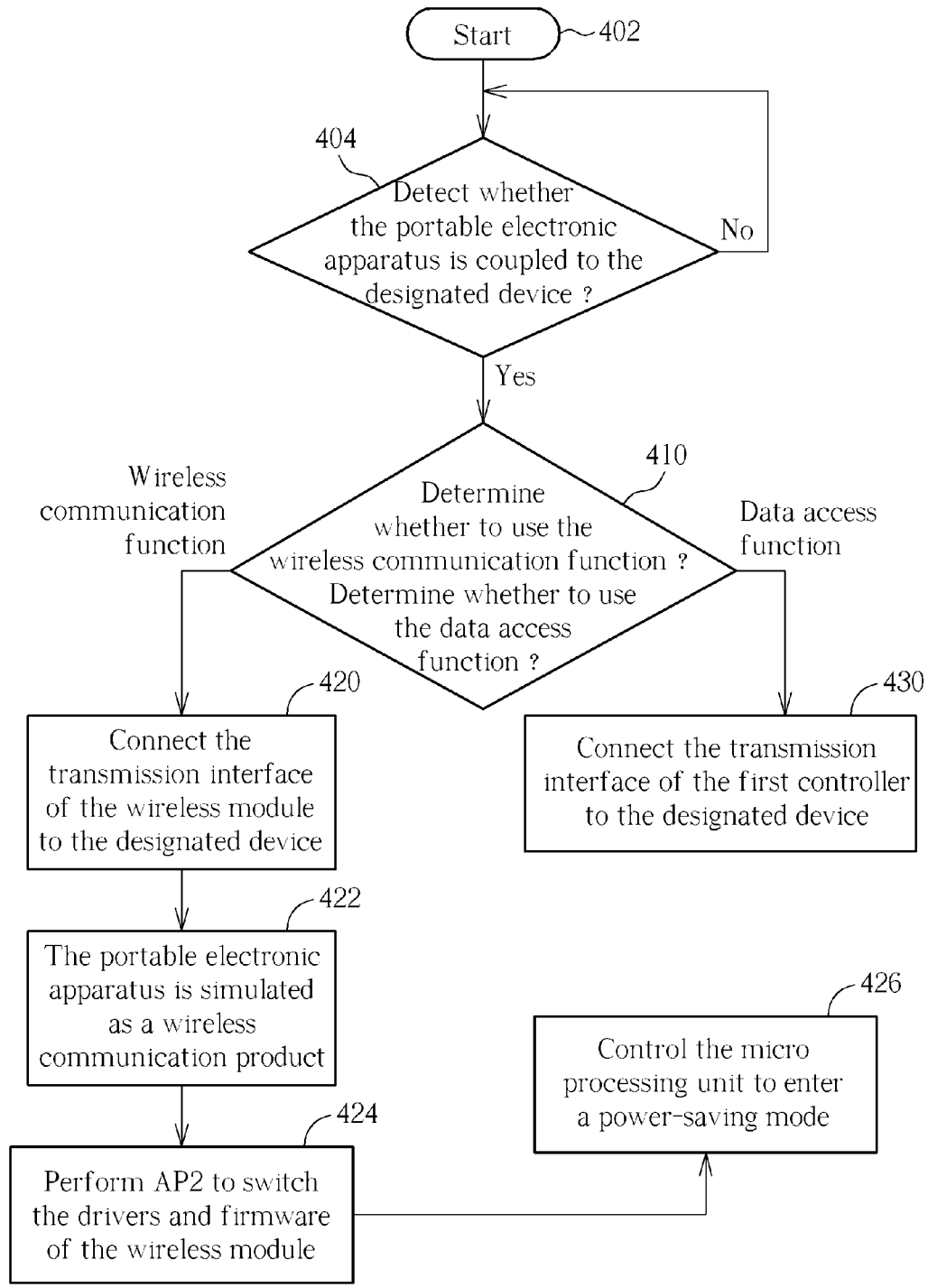
FIG. 4 is flowchart illustrating a method for simulating a wireless communication product by utilizing a portable electronic apparatus according to an exemplary embodiment of the present invention.

Please refer to FIG. 4. FIG. 4 is flowchart illustrating a method for simulating a wireless communication product by utilizing a portable electronic apparatus according to an exemplary embodiment of the present invention. Please note that the following steps are not limited to be performed according to the exact sequence shown in FIG. 4 if a roughly identical result can be obtained. The method includes, but is not limited to, the following steps:

Step 402: Start.

Step 404: Detect whether the portable electronic apparatus is coupled to the designated device. When the portable electronic apparatus is coupled to the designated device, go to Step 410; otherwise, go back to Step 404.

Step 410: Determine whether to use the wireless communication function and whether to use the data access function to generate a determining result. When the determining result indicates that the designated device chooses to use the wireless communication function without using the data access function, go to Step 420; and when the determining result indicates that the designated device chooses to use the data access function without using the wireless communication function, go to Step 430.

Step 420: Connect the transmission interface of the wireless module to the designated device. After that, go to Step 422.

Step 422: The portable electronic apparatus is simulated as a wireless communication product. After that, go to Step 424.

Step 424: Perform a second designated application program to switch the drivers and firmware of the wireless module. After that, go to Step 426.

Step 426: Control the micro processing unit to enter a power-saving mode.

Step 430: Connect the transmission interface of the first controller to the designated device.

How each element operates can be known by collocating the steps shown in FIG. 4 together with the elements shown in FIG. 2 or FIG. 3. And further description of the steps shown in FIG. 4 is omitted here for brevity. The step 404 is executed by the detecting circuit 140, the step 410 is executed by the determining circuit 150, and the steps 420-430 are executed by the control circuit 160 or 360. Be noted that the control circuit 160/360 can selectively switch paths, i.e. connecting the transmission interface of the first controller 121 or the transmission interface of the wireless module 110 to the designated device 200, depending on whether to use the wireless communication function and whether to use the data access function.

Figure 5:
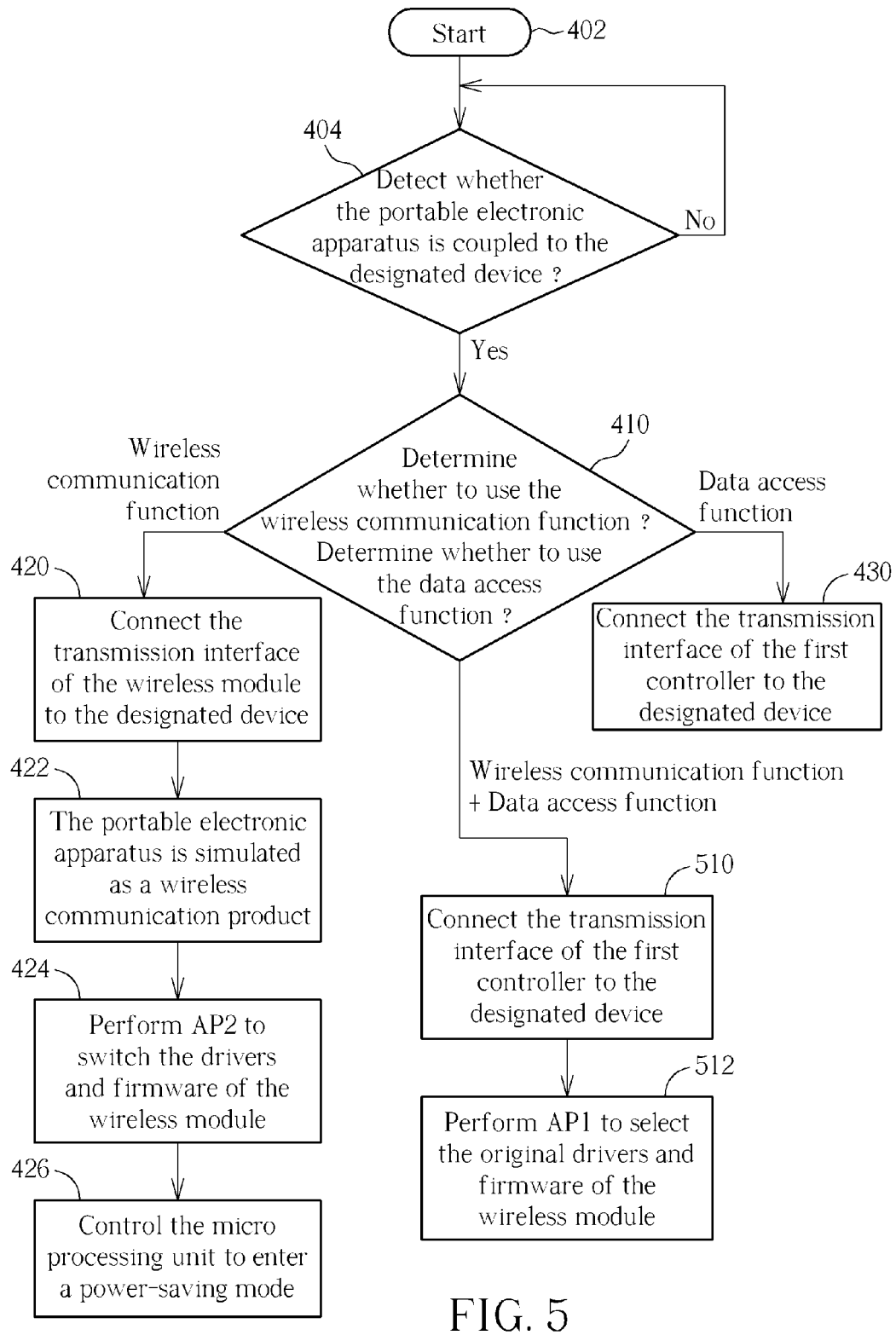
FIG. 5 is flowchart illustrating a method for simulating a wireless communication product by utilizing a portable electronic apparatus according to another exemplary embodiment of the present invention.

Please refer to FIG. 5. FIG. 5 is flowchart illustrating a method for simulating a wireless communication product by utilizing a portable electronic apparatus according to another exemplary embodiment of the present invention. The method includes, but is not limited to, the following steps:

Step 402: Start.

Step 404: Detect whether the portable electronic apparatus is coupled to the designated device. When the portable electronic apparatus is coupled to the designated device, go to Step 410; otherwise, go back to Step 404.

Step 410: Determine whether to use the wireless communication function and whether to use the data access function to generate a determining result. When the determining result indicates that the designated device chooses to use the wireless communication function without using the data access function, go to Step 420; when the determining result indicates that the designated device chooses to use the data access function without using the wireless communication function, go to Step 430; and when the determining result indicates that the designated device chooses to use the data access function together with the wireless communication function simultaneously, go to Step 510.

Step 420: Connect the transmission interface of the wireless module to the designated device. After that, go to Step 422.

Step 422: The portable electronic apparatus is simulated as a wireless communication product. After that, go to Step 424.

Step 424: Perform a second designated application program to switch the drivers and firmware of the wireless module. After that, go to Step 426.

Step 426: Control the micro processing unit to enter a power-saving mode.

Step 430: Connect the transmission interface of the first controller to the designated device.

Step 510: Connect the transmission interface of the first controller to the designated device. After that, go to Step 512.

Step 512: Perform a first designated application program to select the original drivers and firmware of the wireless module.

Please note that the steps shown in FIG. 5 are similar to the steps shown in FIG. 4, which is a varied embodiment of FIG. 4. The difference between them is that the flowchart shown in FIG. 5 further consists of a third condition—a condition that the designated device chooses to use the data access function together with the wireless communication function simultaneously (i.e. the steps 510 and 512). How each element operates can be known by collocating the steps shown in FIG. 5 together with the elements shown in FIG. 2 or FIG. 3. And further description of the steps shown in FIG. 5 is omitted here for brevity. The steps 510 and 512 are executed by the control circuit 160 or 360.

Please note that, the steps of the abovementioned flowcharts are merely exemplary embodiments of the present invention, and in no way should be considered to be limitations of the scope of the present invention. These methods can include other intermediate steps or can merge several steps into a single step without departing from the spirit of the present invention.

The abovementioned embodiments are presented merely for describing features of the present invention, and in no way should be considered to be limitations of the scope of the present invention. In summary, the present invention provides a portable electronic apparatus (e.g. a mobile phone or a PDA) capable of simulating as a wireless communication product (e.g. a wireless LAN card) and method thereof. By adding the control circuit (such as a multiplexer or a switch) to switch paths/modes, the transmission interface of the first controller or the transmission interface of the wireless module can be selectively connected to the designated device (such as a desktop computer or a notebook computer). As a result, when the designated device chooses to use the wireless communication function without using the data access function, it is able to directly use wireless communication function (such as a wireless Internet access function) offered by the wireless module without processes of the micro processing unit of the portable electronic apparatus. Therefore, the efficiency of wireless Internet access can be improved so as to approximate to the simulation of the wireless LAN card. Moreover, when the designated device chooses to separately use the wireless communication function without using the data access function, the micro processing unit can be further controlled to enter a power-saving mode (e.g. a stand-by mode) to save power consumption of the portable electronic apparatus.

Those skilled in the art will readily observe that numerous modifications and alterations of the device and method may be made while retaining the teachings of the invention.

What is claimed is:

1. A portable electronic apparatus capable of simulating as a wireless communication product, comprising:
   a wireless module, used for providing a wireless communication function;
   a micro processing unit, comprising:
      a first controller, used for controlling operations of the portable electronic apparatus and for providing a data access function; and a second controller, for controlling operations of the wireless module;

a determining circuit, for determining whether to use the wireless communication function and whether to use the data access function to generate a determining result when a designated device is coupled to the portable electronic apparatus; and a control circuit, coupled to the determining circuit, for selecting to connect a transmission interface of the first controller or a transmission interface of the wireless module to the designated device according to the determining result.

2. The portable electronic apparatus of claim 1, wherein when the control circuit connects the transmission interface of the wireless module to the designated device, the portable electronic apparatus is simulated as the wireless communication product.

3. The portable electronic apparatus of claim 1, wherein:

when the determining result indicates that the designated device chooses to use the wireless communication function without using the data access function, the control circuit connects the transmission interface of the wireless module to the designated device;

when the determining result indicates that the designated device chooses to use the data access function without using the wireless communication function, the control circuit connects the transmission interface of the first controller to the designated device; and when the determining result indicates that the designated device chooses to use the wireless communication function together with the data access function simultaneously, the control circuit connects the transmission interface of the first controller to the designated device.

4. The portable electronic apparatus of claim 3, wherein the control circuit is further used for:

performing a designated application program to switch drivers and firmware of the wireless module when the determining result indicates that the designated device chooses to use the wireless communication function without using the data access function.

5. The portable electronic apparatus of claim 3, wherein the control circuit is further used for:

controlling the micro processing unit to enter a power-saving mode when the determining result indicates that the designated device chooses to use the wireless communication function without using the data access function.

6. The portable electronic apparatus of claim 1, wherein the control circuit comprises a multiplexer.

7. The portable electronic apparatus of claim 1, wherein the control circuit comprises a switch.

8. The portable electronic apparatus of claim 1, further comprising:

a detecting circuit, coupled to the determining circuit, for detecting whether the portable electronic apparatus is coupled to the designated device;

wherein when the detecting circuit detects that the portable electronic apparatus is coupled to the designated device, the determining circuit determines whether the designated device uses the wireless communication function and whether the designated device uses the data access function.

9. The portable electronic apparatus of claim 1, wherein the wireless communication product is a wireless LAN card, and the wireless communication function of the wireless module is a wireless Internet access function.

10. The portable electronic apparatus of claim 1, wherein the portable electronic apparatus is a mobile phone or a personal digital assistant.

11. A method for simulating a wireless communication product by utilizing a portable electronic apparatus, the portable electronic apparatus comprising a wireless module for providing a wireless communication function and a first controller for providing a data access function, the method comprising:

when a designated device is coupled to the portable electronic apparatus, determining whether the designated device uses the wireless communication function and whether the designated device uses the data access function to generate a determining result; and selecting to connect a transmission interface of the first controller or a transmission interface of the wireless module to the designated device according to the determining result.

12. The method of claim 11, wherein when the transmission interface of the wireless module is coupled to the designated device, the portable electronic apparatus is simulated as the wireless communication product.

13. The method of claim 11, wherein the step of selecting to connect the transmission interface of the first controller or the transmission interface of the wireless module to the designated device according to the determining result comprises:

when the determining result indicates that the designated device chooses to use the wireless communication function without using the data access function, connecting the transmission interface of the wireless module to the designated device;

when the determining result indicates that the designated device chooses to use the data access function without using the wireless communication function, connecting the transmission interface of the first controller to the designated device; and when the determining result indicates that the designated device chooses to use the wireless communication function together with the data access function simultaneously, connecting the transmission interface of the first controller to the designated device.

14. The method of claim 13, further comprising:

performing a designated application program to switch drivers and firmware of the wireless module when the determining result indicates that the designated device chooses to use the wireless communication function without using the data access function.

15. The method of claim 13, further comprising:

controlling a micro processing unit to enter a power-saving mode when the determining result indicates that the designated device chooses to use the wireless communication function without using the data access function.

16. The method of claim 11, further comprising:

detecting whether the portable electronic apparatus is coupled to the designated device.

17. The method of claim 11, wherein the wireless communication product is a wireless LAN card, and the wireless communication function of the wireless module is a wireless Internet access function.

* * * * *